United States Patent
Blagojevic et al.

(10) Patent No.: US 8,112,746 B2
(45) Date of Patent: Feb. 7, 2012

(54) METHOD FOR UPGRADING APPLICATION DATA ACCORDING TO A NEW APPLICATION DEFINITION

(75) Inventors: Vladimir Blagojevic, Toronto (CA); Michael Shenfield, Richmond Hill (CA); Viera Bibr, Kilbride (CA); Bryan R. Goring, Milton (CA); Kamen B. Vitanov, Mississauga (CA)

(73) Assignee: Research In Motion Limited, Waterloo, Ontario (CA)

( * ) Notice: Subject to any disclaimer, the term of this patent is extended or adjusted under 35 U.S.C. 154(b) by 1296 days.

(21) Appl. No.: 11/108,058

(22) Filed: Apr. 18, 2005

(65) Prior Publication Data

US 2006/0236314 A1    Oct. 19, 2006

(51) Int. Cl.
*G06F 9/44* (2006.01)
*G06F 1/24* (2006.01)

(52) U.S. Cl. ......... 717/168; 717/170; 717/173; 713/100
(58) Field of Classification Search .......................... None
See application file for complete search history.

(56) References Cited

U.S. PATENT DOCUMENTS

| | | | |
|---|---|---|---|
| 4,558,413 A | 12/1985 | Schmidt et al. | |
| 6,167,567 A | 12/2000 | Chiles et al. | |
| 6,286,138 B1 | 9/2001 | Purcell | |
| 6,484,315 B1 | 11/2002 | Ziese | |
| 6,614,804 B1 | 9/2003 | McFadden et al. | |
| 6,880,084 B1* | 4/2005 | Brittenham et al. | 713/173 |
| 6,996,818 B2* | 2/2006 | Jacobi et al. | 717/170 |
| 7,539,985 B2* | 5/2009 | Marvin | 717/170 |
| 7,549,042 B2* | 6/2009 | Glaum et al. | 713/100 |
| 2002/0069213 A1 | 6/2002 | Moslander et al. | |
| 2003/0204711 A1* | 10/2003 | Guess | 713/1 |
| 2004/0098715 A1* | 5/2004 | Aghera et al. | 717/173 |
| 2005/0055684 A1* | 3/2005 | Rao et al. | 717/168 |
| 2005/0223372 A1* | 10/2005 | Borchers | 717/168 |

FOREIGN PATENT DOCUMENTS

EP    0 848 341        6/1998
WO    WO 0246909 A1  * 6/2002

OTHER PUBLICATIONS

Lyu et al, A Procedure Based Dynamic Software Update, International Conference on Dependable Systems and Networks, Jul. 2001, pp. 271-280, Retrieved on [Oct. 18, 2011] Retrieved from the Internet: URL<http://ieeexplore.ieee.org/stamp/stamp.jsp?tp=&arnumber=941412>.*

Menten, L.E. Experiences in the APplication of XML for Device Management, IEEE Communtications Magazine, Jul. 2004, pp. 92-100, Retrieved on [Oct. 18, 2011] Retrieved from the Internet:URL<http://ieeexplore.ieee.org/stamp/stamp.jsp?tp=&arnumber=1316539>.*

IBM Technical Disclosure Bulletin, Description Scripting Language for Updating and Installing Application via the Internet, XP-000728370 , vol. 40, No. 6, Jun. 1997 pp. 151-153.

* cited by examiner

*Primary Examiner* — Thuy Dao
*Assistant Examiner* — Cheneca Smith

(57) ABSTRACT

A method is disclosed for upgrading preexisting application data according to a new application definition, the method comprises parsing the preexisting application data to provide parsed preexisting application data and converting the parsed preexisting application data according to the new application definition to thereby provide application data compliant with the new application definition.

20 Claims, 6 Drawing Sheets

METHOD FOR UPGRADING APPLICATION DATA ACCORDING TO A NEW APPLICATION DEFINITION

TECHNICAL FIELD

This invention relates to the field of computer software. More precisely, this invention pertains to a method for upgrading application data according to new application definitions.

BACKGROUND OF THE INVENTION

Application upgrades is one of the primary artifacts of software applications. Effective application upgrades have been a concern since the conception of software itself. Current state-of-the-art application upgrades are essential for low cost maintenance of applications. Normally, they consist of automatic upgrades that are pushed to a computer hosting an application. However, multitudes of problems arise when the corresponding version of already existing application data on a host computer is used in a new version of an application. The same problem applies to managing application data and definition upgrades on wireless devices.

It is known to a skilled addressee that a compatible application upgrade is an upgrade that does not change the existing application data definitions.

An incompatible application upgrade is an upgrade that changes application data definitions between two versions of an application. Such an upgrade requires the preexisting application data instances to be converted for a new version of an application.

There is a need for a method that will overcome at least one of the above-identified problems.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

According to an aspect of the invention, there is provided a method for upgrading preexisting application data according to a new application definition, the method comprising parsing the preexisting application data to provide parsed preexisting application data, converting the parsed preexisting application data according to the new application definition to thereby provide application data compliant with the new application definition.

According to another aspect of the invention, there is provided a computer readable medium comprising a program of machine-readable instructions which when executed with a new application definition performs a method for upgrading preexisting application data according to the new application definition, the method comprising parsing the preexisting application data to provide parsed preexisting application data and converting the parsed preexisting application data according to the new application definition to thereby provide application data compliant with the new application definition.

According to another aspect of the invention, there is provided A device for executing an application with preexisting data in accordance with a new application definition, the device comprising: a memory coupled to a processor for storing and executing instructions and data to: parse the preexisting application data to provide parsed preexisting application data; and convert the parsed preexisting application data according to the new application definition to thereby provide application data that is compliant with the new application definition.

Figure 1:
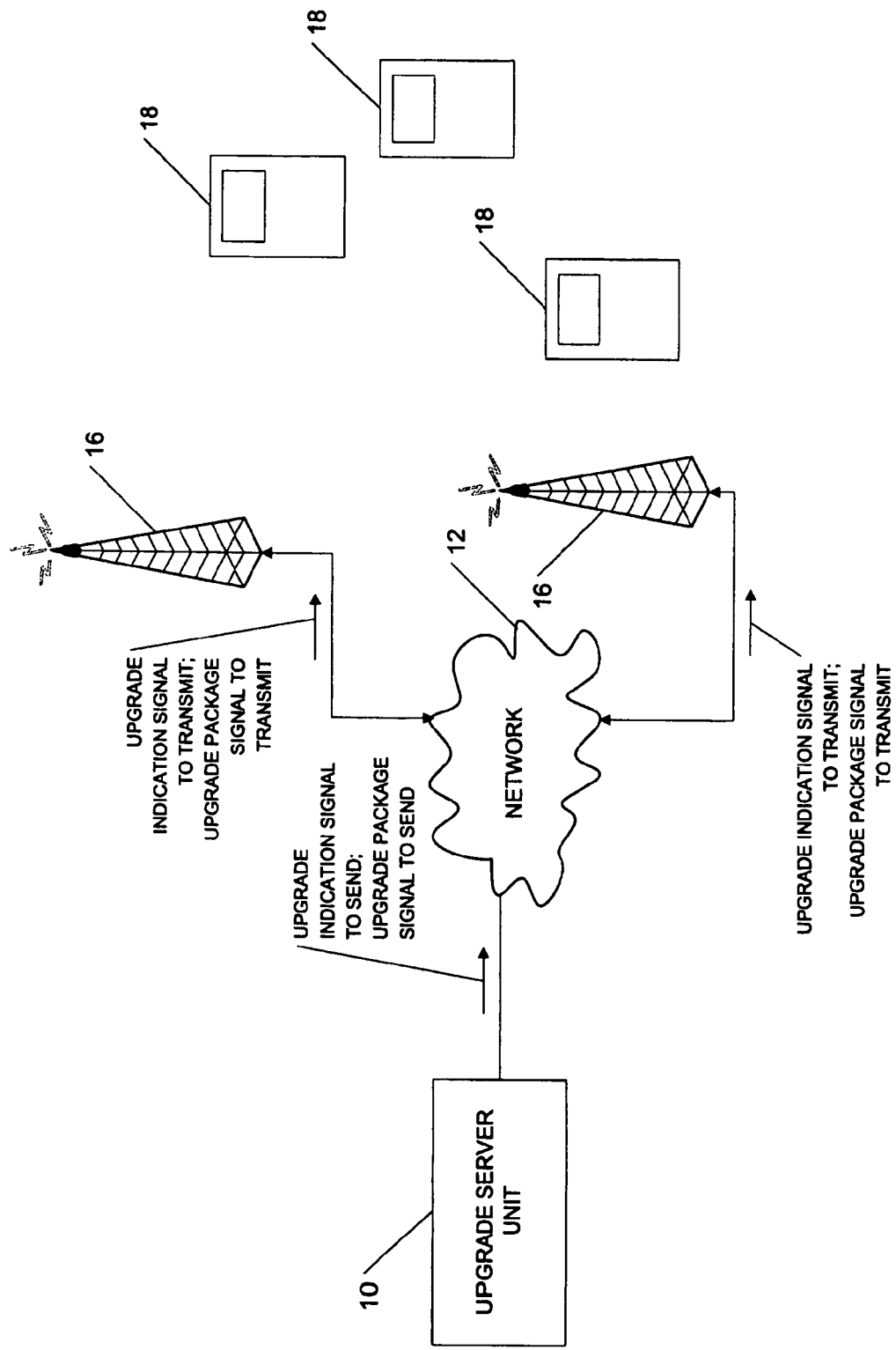
FIG. 1 is a block diagram of a system for upgrading preexisting application data of a user device according to an embodiment of the invention.

Now referring to FIG. 1, there is shown an embodiment of a system for upgrading preexisting application data of a user device.

The system comprises an upgrade server unit 10, a network 12, a plurality of transmitting devices 16 and a plurality of user devices 18.

The upgrade server unit 10 is adapted for providing an upgrade of an application to the plurality of user devices 18. The upgrade server unit 10 may comprise any type of processing unit that is connected permanently or temporarily with the plurality of user devices 18.

The network 12 comprises at the least one of a Local Area Network (LAN), a Metropolitan Area Network (MAN) and a Wide Area Network (WAN). In the embodiment disclosed in FIG. 1, the network 12 comprises a Wide Area Network which is the Internet.

The plurality of transmitting devices 16 comprises wireless transmitters which are adapted to transmit data to the plurality of user devices 18.

The plurality of user devices 18 comprises devices that are adapted to process at least data. In one embodiment, shown in FIG. 1, the plurality of user devices 18 are wireless user devices. It should be appreciated that various types of devices may be used such as Personal Digital Assistants (PDAs), smart phones, etc. In an embodiment, the plurality of user devices 18 comprises Blackberry™ devices which are manufactured by Research In Motion Limited. It will be appreciated by the skilled addressee that the plurality of user devices 18 comprises a plurality of applications which may be upgraded. It will also be appreciated that corresponding application data is provided for each application.

More precisely, the upgrade server unit 10 is adapted to provide to the network 12, inter alia, an upgrade indication signal and an upgrade package signal.

At least one of the plurality of transmitting devices 16 is adapted to transmit an upgrade indication signal and an upgrade package signal to at least one of the plurality of user devices 18.

Figure 2:
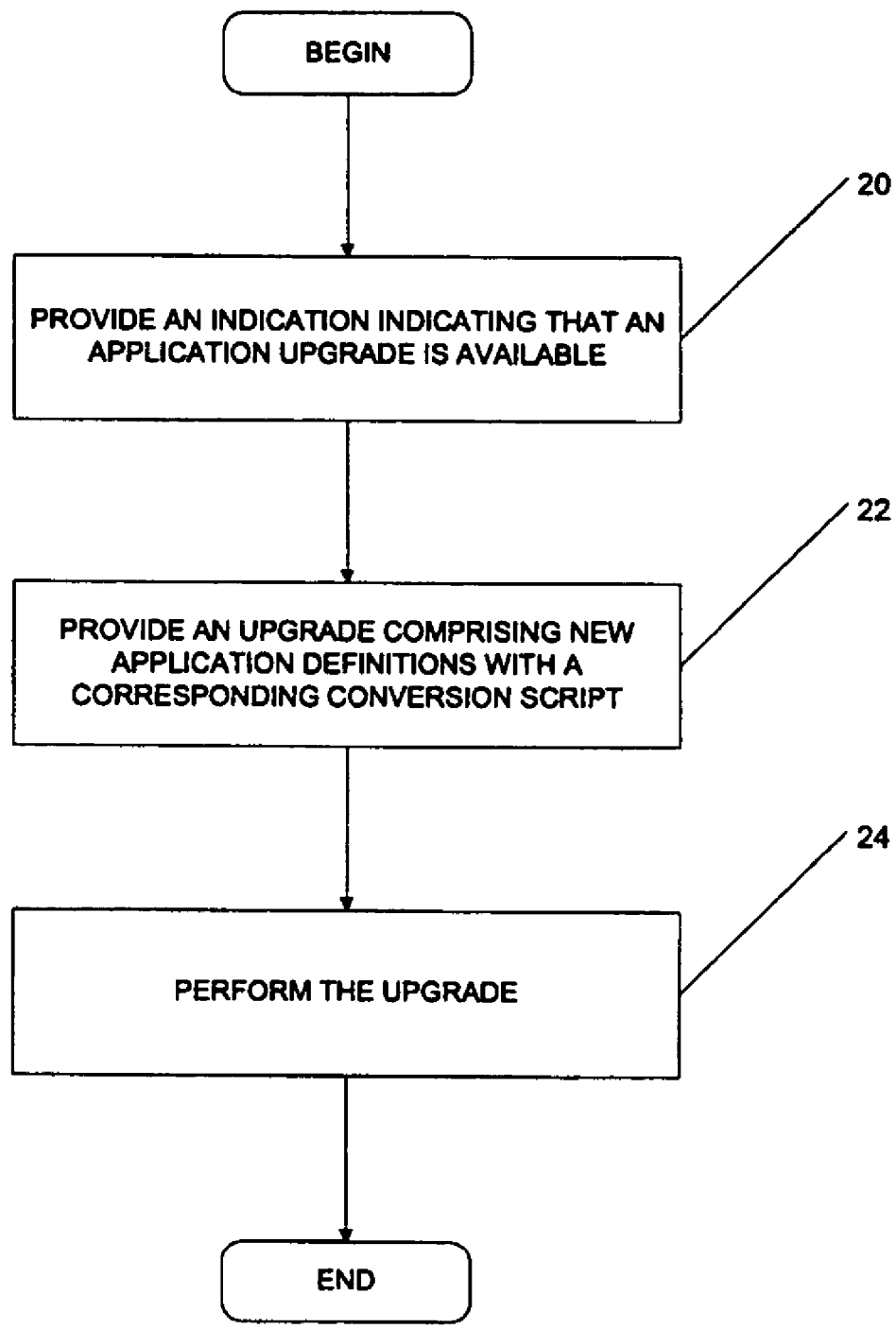
FIG. 2 is a flowchart showing a method according to an embodiment of the invention where an upgrade is performed; an indication that an application upgrade is available is provided to a user device; the upgrade is provided to the user device and the upgrade is then performed.

Now referring to FIG. 2, there is shown how an upgrade is performed according to one embodiment.

According to step 20, an indication that an application upgrade is available is provided. In one embodiment, the indication is provided by the upgrade server unit 10 to a user device of the plurality of user devices 18 via the network 12 and the plurality of transmitting devices 16. Alternatively, the indication may be provided directly by another processing unit.

According to step 22, an upgrade comprising new application definitions with a corresponding conversion script is provided. In one embodiment, the upgrade is provided to the user device via the network 12 and the plurality of transmitting devices 16. Alternatively, the upgrade may be provided directly by another processing unit.

According to step 24, the upgrade is performed. In one embodiment, the upgrade is performed by the user device 18.

Figure 3:
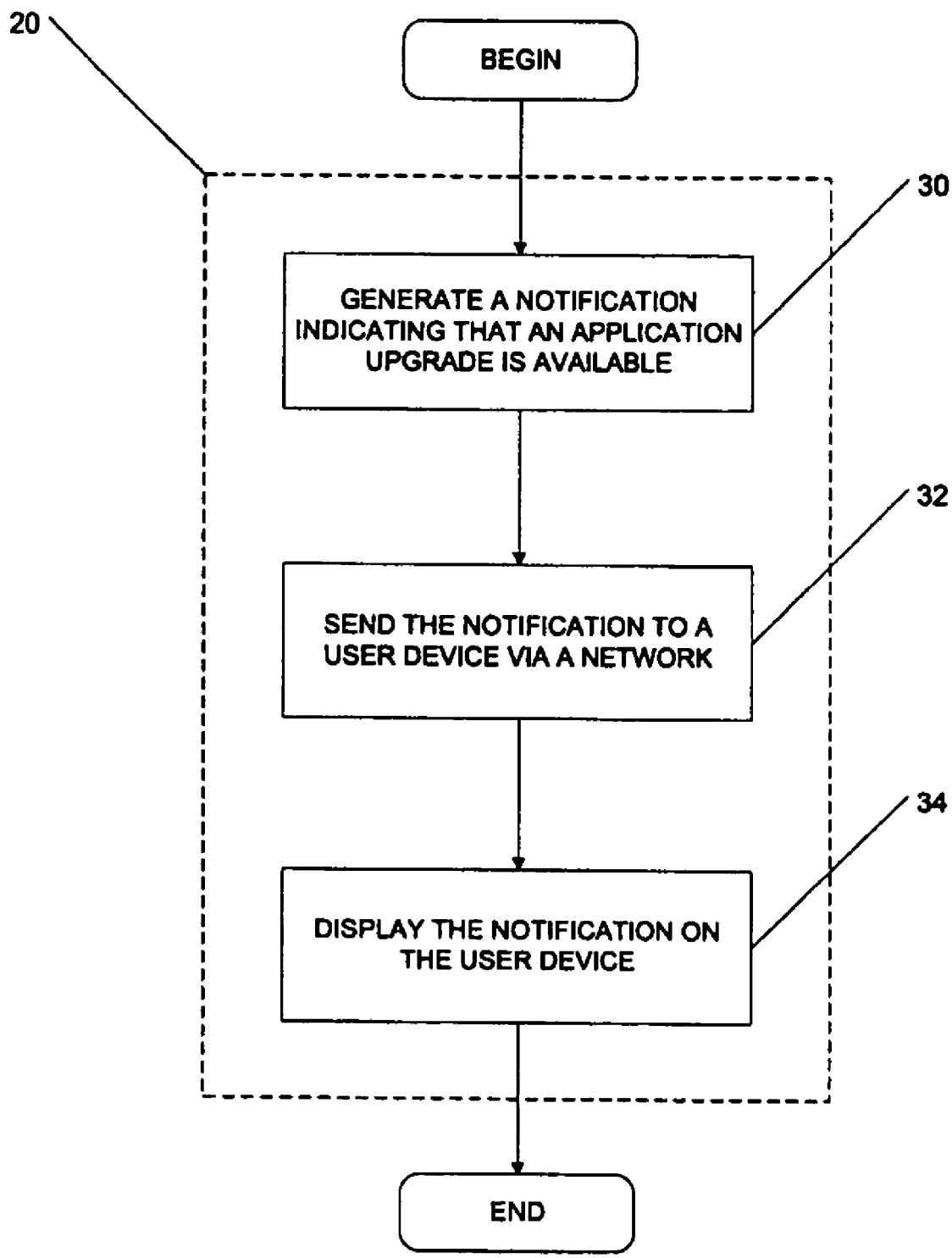
FIG. 3 is a flowchart showing how the indication that an application upgrade is available is provided in one embodiment of the invention.

Now referring to FIG. 3, there is shown how the indication indicating that an application upgrade is available is provided.

According to step 30, a notification indicating that an application upgrade is available is provided is generated. In one embodiment, the notification (also referred to as upgrade indication signal) is generated by the upgrade server unit 10.

According to step 32, the notification is sent to the user device via a network 12. In one embodiment, the network 12 is used for providing the notification to the user device 18.

According to step 34, the notification is displayed on the user device 18. The skilled addressee will appreciate the various types of notification may be provided and displayed. In one embodiment, the notification may be "upgrade available". Alternatively, the notification may be "upgrade required" (with an optional grace period). In the latter case the upgrade will be executed automatically on the user device without any user intervention. It should be appreciated that during the optional grace period, a user device may be allowed to use a currently installed version of a wireless application that has a pending upgrade.

Figure 4:
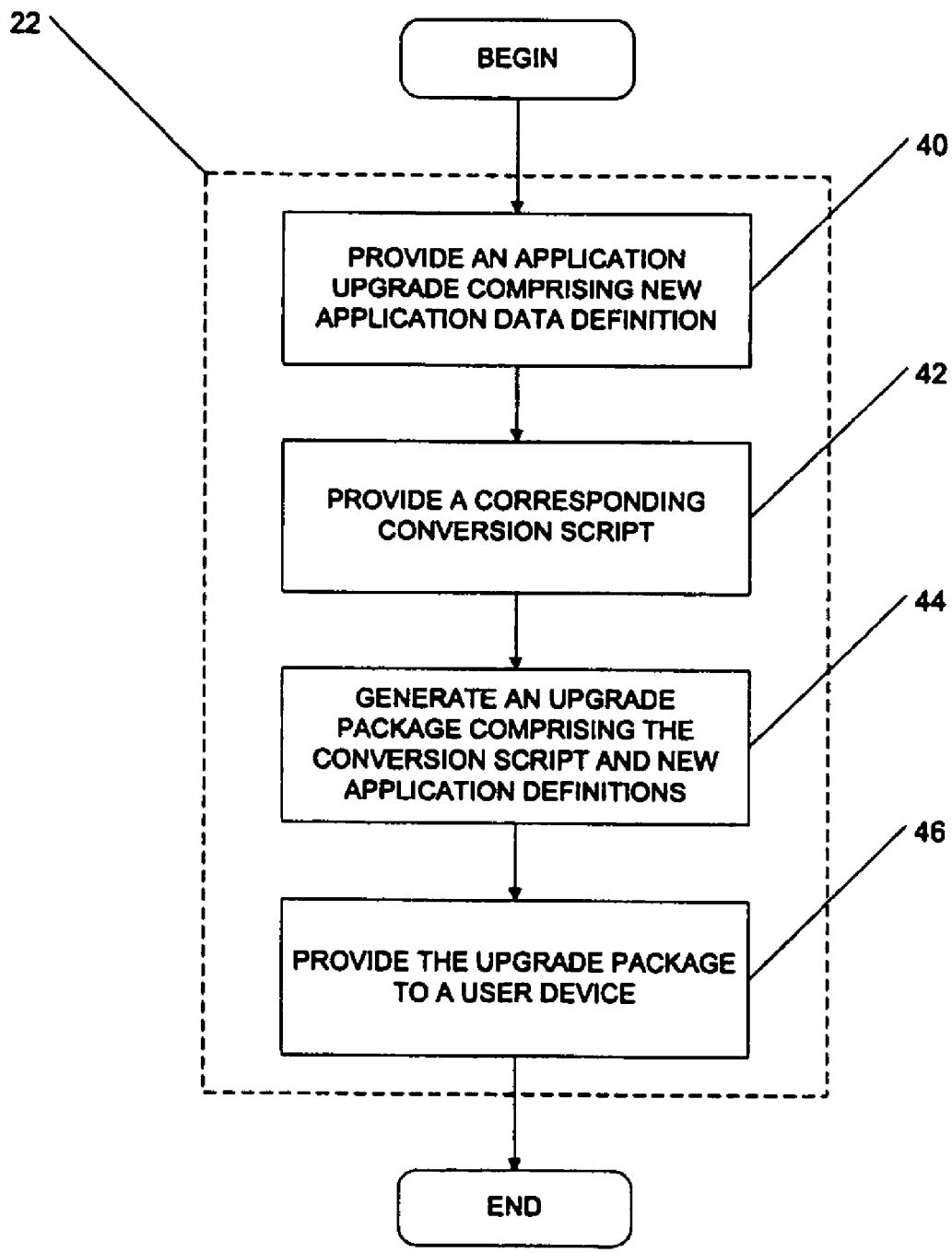
FIG. 4 is a flowchart showing how the upgrade is provided to a user unit.

Now referring to FIG. 4, there is shown an embodiment for performing the upgrade. According to step 40, an application upgrade comprising new application data definitions is provided.

According to step 42, a corresponding conversion script is provided.

According to step 44, an upgrade package comprising the conversion script and the new application definitions is generated.

It will be appreciated by the skilled addressee that the upgrade package comprises at least one file adapted to be executed by a user device in which the upgrade has to be performed.

According to step 46, the generated upgrade package is provided to the user device. In one embodiment, the generated upgrade package is provided to the user device by the upgrade server unit 10 via the network 12 and at least one of the plurality of transmitting devices 16.

Alternatively, the generated upgrade package may be provided to the user device using another processing device.

Figure 5:
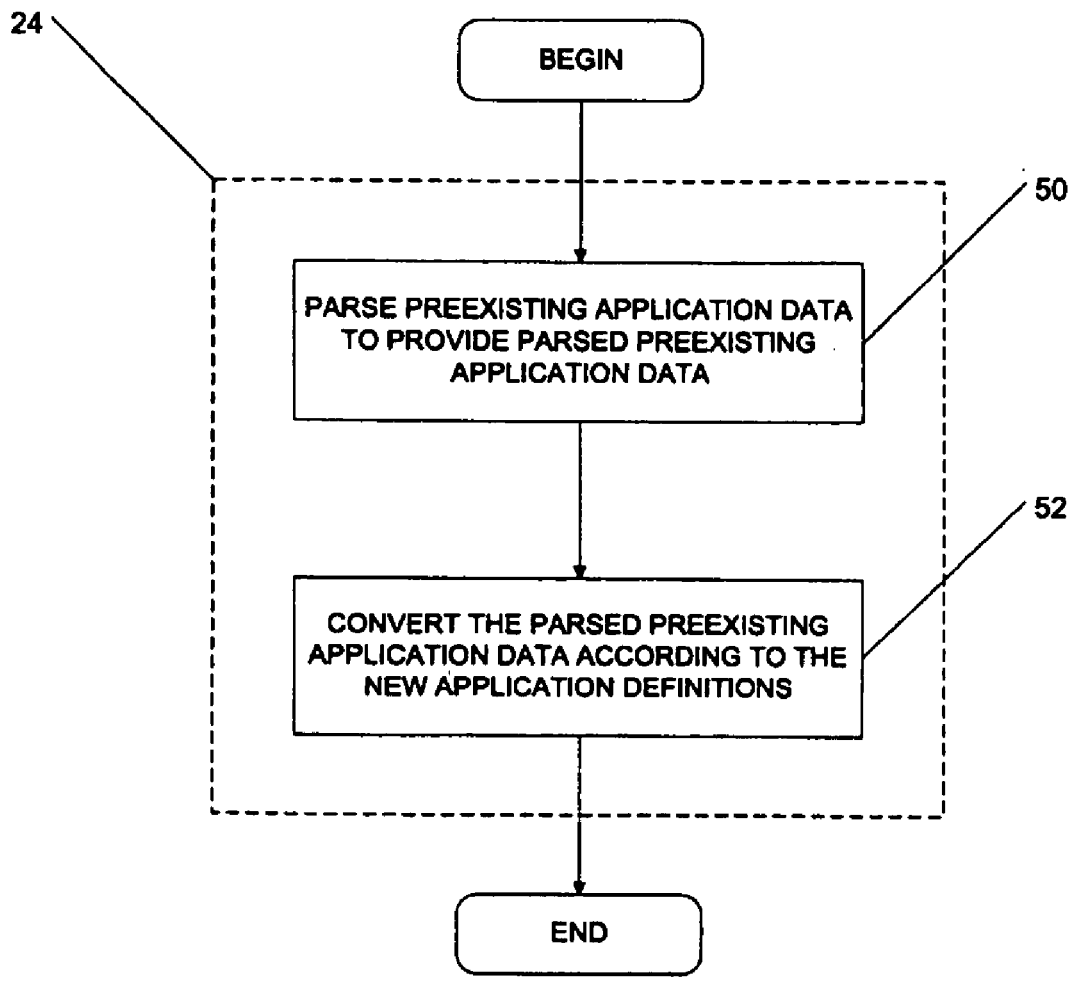
FIG. 5 is a flowchart showing how the upgrade is performed according to one embodiment of the invention.

Now referring to FIG. 5, there is shown how the upgrade is performed according to one embodiment of the invention.

According to step 50, preexisting application data is parsed to provide parsed preexisting application data.

In one embodiment, the preexisting application data is parsed using the conversion service. The conversion service is preferably installed on the wireless device. It will be appreciated that the parsing may be performed in response to a given remotely provided event. In such case, the given event comprises receiving an indication to the effect that new application definition is available. Also the given event may further comprise accepting to perform an upgrade.

It will be appreciated that the parsing is performed according to a parsing language which is a meta tag language such as XML in one embodiment.

According to step 52, the parsed preexisting application data is converted according to the new application definitions.

Figure 6:
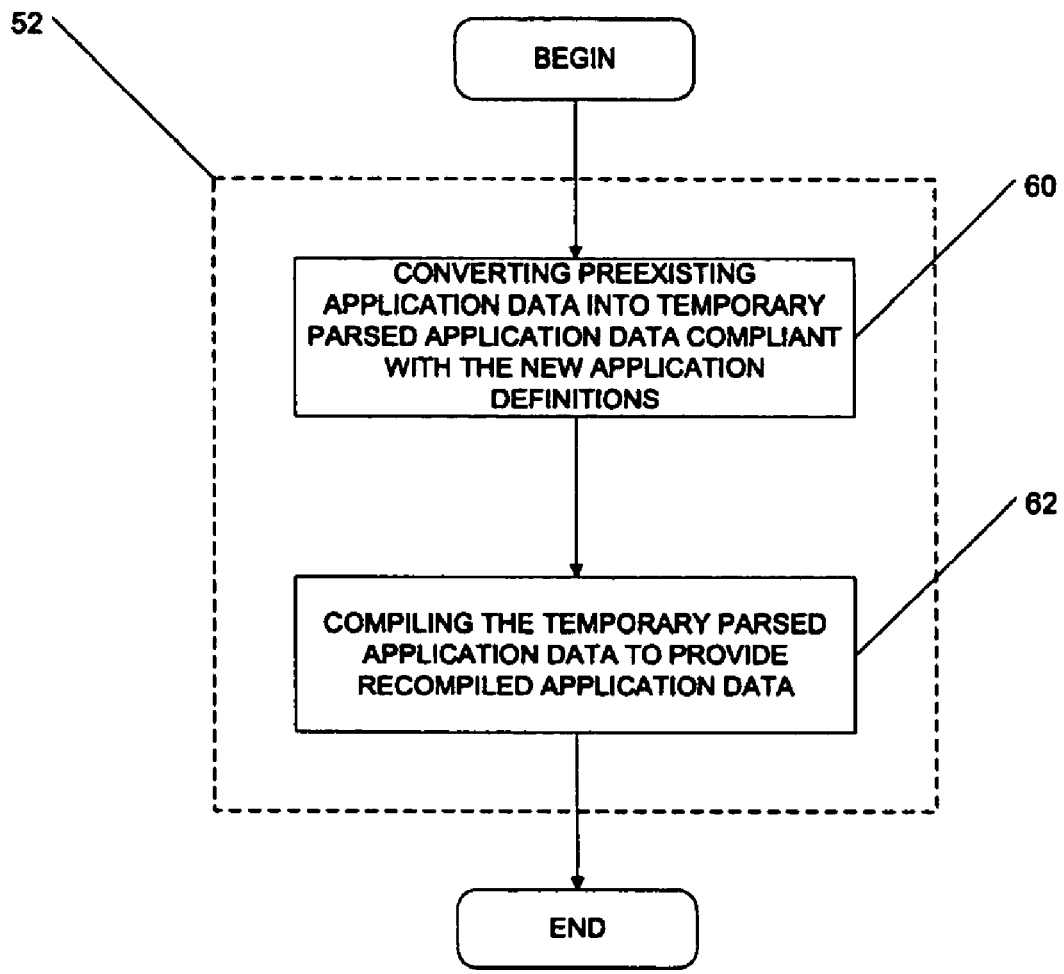
FIG. 6 is a flowchart showing how parsed preexisting application data is converted in one embodiment.

Now referring to FIG. 6, there is shown how the parsed preexisting application data is converted according to new application definitions in one embodiment where the application data comprises compiled data.

According to step 60, the parsed preexisting application data is converted into a temporary parsed application data compliant with the new application definitions. This is performed using the conversion script in one embodiment of the invention. The conversion script may thus simply convert one XML document into another XML document. This is otherwise known as XML document transformation.

According to step 62, the temporary parsed application data compliant with the new application definitions is compiled to provide a recompiled application data compliant with the new application definitions. In one embodiment, this is further performed by the conversion script.

It will be appreciated that the fact that the process of converting the preexisting application data is performed by the user device is of great advantage. A first advantage of performing such an in situ upgrade is the fact that bandwidth is saved by avoiding the transmittal of the preexisting application data to an upgrade server and the transmittal back of the converted application data to the user device.

Furthermore, it will be appreciated that another advantage is the fact that it is possible to easily manage a plurality of user devices by selecting which user devices have to be upgraded. Deploying an upgrade may therefore be performed in a parallel way.

It should further be appreciated by the skilled addressee that a similar upgrade mechanism may be used for an application container which is a software application running on a wireless device providing a runtime environment to other wireless application. In such case, all wireless applications hosted by a particular container are converted in one embodiment into an XML format along with application data. The container itself may then be upgraded and applications previously hosted by the container are reloaded along with their application data.

While illustrated in the block diagrams as groups of discrete components communicating with each other via distinct data signal connections, it will be understood by those skilled in the art that the preferred embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present preferred embodiment.

It should be noted that the present invention can be carried out as a method, can be embodied in a system, a computer readable medium or an electrical or electro-magnetical signal.

The embodiments of the invention described above are intended to be exemplary only. The scope of the invention is therefore intended to be limited solely by the scope of the appended claims.

We claim:

1. A method for upgrading in a wireless user device preexisting application data comprising compiled data according to a new application definition, said method comprising:

receiving a conversion script at the wireless user device together with said new application definition from a location remote to said wireless user device;

parsing said preexisting application data at said wireless user device to provide parsed preexisting application data represented in a meta tag language;

converting at said wireless user device, using said conversion script, said parsed preexisting application data to temporary parsed application data represented in the meta tag language compliant with said new application definition;

compiling at the wireless device said temporary parsed application data to provide a recompiled application data that is compliant with said new application definition.

2. The method as claimed in claim 1, wherein said meta tag language comprises XML.

3. The method as claimed in claim 2, wherein said script applies an XML document transformation.

4. The method as claimed in claim 1, wherein said parsing of said preexisting application data comprises performing said parsing in response to a given event provided remotely.

5. The method as claimed in claim 4, wherein said given event comprises receiving at the wireless user device an indication to the effect that said new application definition is available.

6. The method as claimed in claim 5, wherein said given event further comprises accepting to perform said upgrade according to said new application definition.

7. The method as claimed in claim 5, wherein said given event further comprises the expiry of a grace period during which accepting to perform said upgrade is optional.

8. The method as claimed in claim 1, wherein said parsing and said converting comprise executing said script with said new application definition.

9. The method as claimed in claim 1, in which said script and said new application definition are provided to said wireless user device using at least one of a Local Area Network, a Metropolitan Area Network and a Wide Area Network.

10. The method as claimed in claim 1, wherein said script and said new application definition are provided to said wireless user device from another wireless user device.

11. A tangible non-transitory computer readable medium on which is stored a program of machine-readable instructions which when executed with a new application definition by a processor of a wireless user device performs a method for upgrading preexisting application data comprising compiled data according to said new application definition, said method comprising:

receiving a conversion script at the wireless user device together with said new application definition from a location remote to said wireless user device;

parsing said preexisting application data at said wireless user device to provide parsed preexisting application data represented in a meta tag language;

converting, using said conversion script, said parsed preexisting application data at said wireless user device to temporary parsed application data represented in the meta tag language compliant with said new application definition; and compiling at the wireless device said temporary parsed application data to provide a recompiled application data that is compliant with said new application definition.

12. A wireless user device for executing an application with preexisting compiled data in accordance with a new application definition, the device comprising:

a memory coupled to a processor for storing and executing instructions and data to:

receive a conversion script at the wireless user device together with said new application definition from a location remote to said wireless user device;

parse said preexisting application data at the wireless user device to provide parsed preexisting application data represented in a meta tag language;

convert at the wireless user device, using said conversion script, said parsed preexisting application data to temporary parsed application data represented in the meta tag language compliant with said new application definition;

compiling at the wireless device said temporary parsed application data to provide a recompiled application data that is compliant with said new application definition.

13. The wireless user device as claimed in claim 12, wherein said meta tag language comprises XML.

14. The wireless user device as claimed in claim 13, wherein said script applies an XML document transformation.

15. The wireless user device as claimed in claim 12, wherein said parsing of said preexisting application data comprises performing said parsing in response to a given event provided remotely.

16. The wireless user device as claimed in claim 15, wherein said given event comprises receiving an indication to the effect that said new application definition is available.

17. The wireless user device as claimed in claim 16, wherein said given event further comprises accepting to perform said upgrade according to said new application definition.

18. The wireless user device as claimed in claim 12, wherein said parsing and said converting comprise executing said script with said new application definition.

19. The wireless user device as claimed in claim 12, in which said script and said new application definition are provided to said wireless user device using at least one of a Local Area Network, a Metropolitan Area Network and a Wide Area Network.

20. The wireless user device as claimed in claim 12, wherein said script and said new application definition are provided to said wireless user device from another wireless user device.

* * * * *